United States Patent [19]

King

[11] Patent Number: 4,858,501
[45] Date of Patent: Aug. 22, 1989

[54] SHIFT INHIBIT VALVE FOR A TRANSMISSION CONTROL

[75] Inventor: Michael F. King, Brownsburg, Ind.

[73] Assignee: General Motors Corporation, Detroit, Mich.

[21] Appl. No.: 230,938

[22] Filed: Aug. 11, 1988

[51] Int. Cl.⁴ ............................................. B60K 41/06
[52] U.S. Cl. ........................................ 74/868; 74/867
[58] Field of Search .................... 74/867, 868, 869, 878

[56] References Cited

U.S. PATENT DOCUMENTS

| | | | |
|---|---|---|---|
| 3,927,579 | 12/1975 | Golan | 74/868 X |
| 4,688,449 | 8/1987 | Harada et al. | 74/869 X |
| 4,718,311 | 1/1988 | Hayakawa et al. | 74/868 |
| 4,719,822 | 1/1988 | Morisawa | 74/868 X |
| 4,721,018 | 1/1988 | Harada et al. | 74/867 X |
| 4,726,262 | 2/1988 | Hayakawa et al. | 74/878 X |

Primary Examiner—Dwight G. Diehl
Attorney, Agent, or Firm—Donald F. Scherer

[57] ABSTRACT

A transmission is operable to establish a plurality of forward speed ratios for a vehicle. The interchange of ratios is controlled by an electro-hydraulic valve arrangement and an inhibiting valve. If electrical power is discontinued and the transmission is operating in the highest speed ratio, the inhibit valve will maintain the highest speed ratio. At lower speed ratios the control will shift the transmission to the third highest speed ratio. During normal operation, the forced downshift from the highest ratio to the third highest ratio is delayed by the inhibit valve until the second highest ratio has been engaged. This prevents engine overspeed which might otherwise occur.

2 Claims, 1 Drawing Sheet

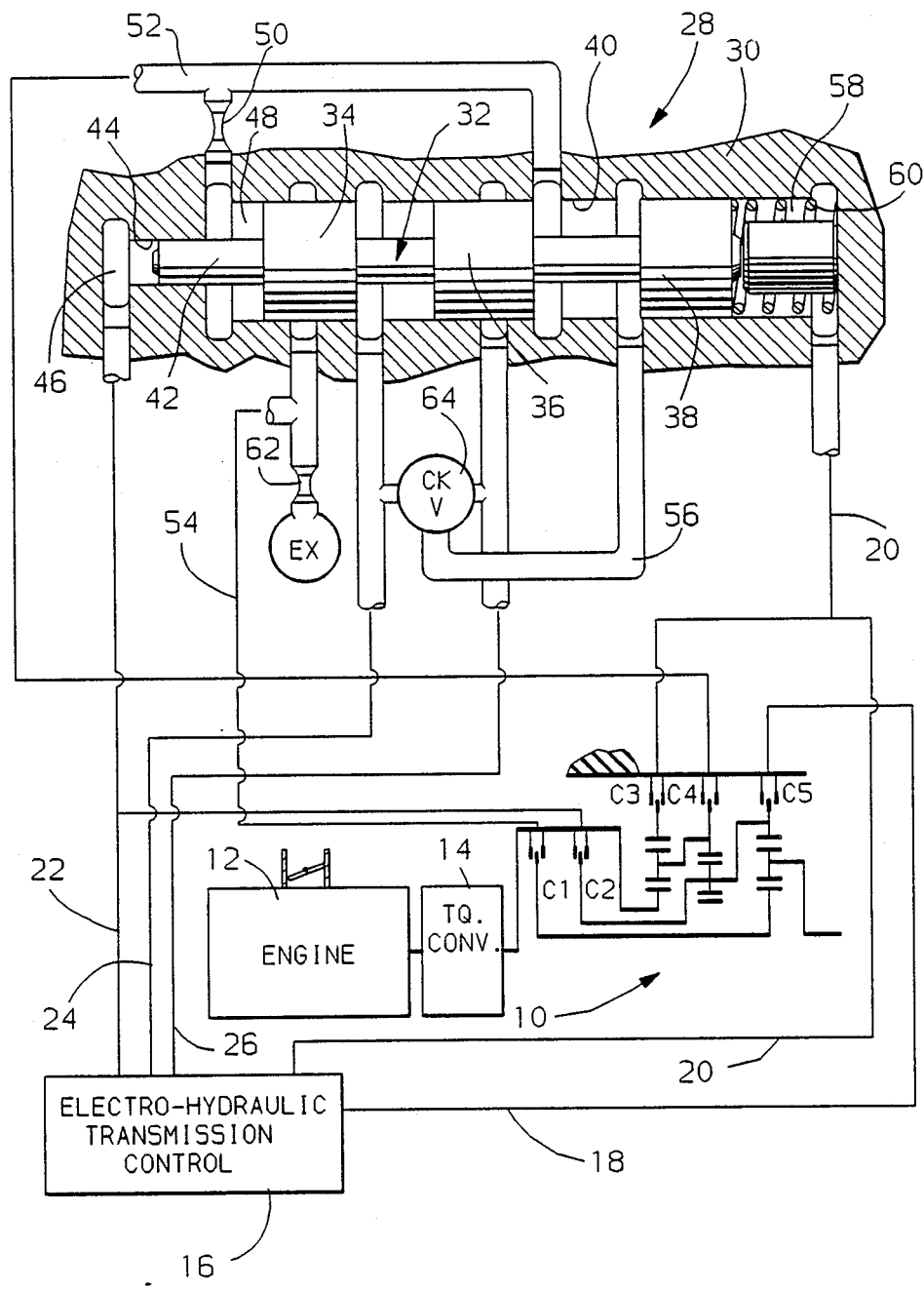

SHIFT INHIBIT VALVE FOR A TRANSMISSION CONTROL

BACKGROUND OF THE INVENTION

This invention relates to transmission controls and more particularly to such controls having a valve member for inhibiting "skip" shifting during downshift from the highest ratio.

SUMMARY OF THE INVENTION

The present invention incorporates into a conventional transmission control a valve member which is responsive to the apply pressures of a plurality of friction devices in the transmission to inhibit skip shifting from the highest ratio to lower ratios. The transmission shift functions, during normal operation, are controlled by electro-hydraulic valves. However, if an electrical malfunction occurs, the transmission will be conditioned for operation at an intermediate speed ratio; i.e., the fourth speed ratio.

If the transmission is operating at the highest speed ratio; i.e., the sixth speed ratio, when the malfunction occurs, the shift to the intermediate ratio can cause significant engine overspeeding. An inhibitor valve prevents the skip shift in this situation and will maintain the transmission in the highest speed ratio. During normal downshifting from the highest ratio, the second highest ratio must be engaged to force the inhibit valve to release the highest ratio.

It is an object of this invention to provide an improved transmission control for a multiratio transmission, wherein an inhibitor valve is effective to prevent the direct downshift from the highest ratio to the third highest ratio.

It is another object of this invention to provide an improved hydraulic control mechanism for a multiratio power transmission having fluid operated ratio establishing devices, wherein an inhibitor valve is positioned by the pressure of the fluid operated devices for establishing the highest ratio to prevent a ratio interchange to the third highest ratio prior to pressurization of the fluid devices relied for establishment of the second highest ratio.

It is a further object of this invention to provide an improved electro-hydraulic control mechanism for a multiratio power transmission having fluid operated ratio establishing devices wherein an inhibitor valve is operable in response to the highest pressure of the ratio establishing device to maintain the transmission at the highest speed ratio if an electrical malfunction occurs during the establishing of the highest speed ratio.

These and other objects and advantages of the present invention will be more apparent from the following specification and drawing.

DESCRIPTION OF THE DRAWING

The drawing is a diagrammatic representation of a valve member incorporated into an electro-hydraulic transmission control for operating a multiratio power transmission.

DESCRIPTION OF THE EMBODIMENT

There is seen in the drawing, a multiratio power transmission, generally designated 10, which is driven by an engine 12 through a torque converter or fluid coupling 14. The transmission 10 has two input friction clutches C1 and C2 and three friction brakes C3, C4 and C5. These friction devices are fluid operated mechanisms of conventional and well known design. The clutches and brakes are selectively operable through the use of an electro-hydraulic transmission control 16 to establish a plurality of speed ratios in the planetary gear arrangements of the transmission 10.

The particular gear arrangement shown is substantially identical to the gearing arrangement shown in U.S. Pat. No. 4,070,927 issued to Polak Jan. 31, 1978, and assigned to the assignee of the present invention.

This gearing arrangement is operable to provide six forward speeds and a reverse speed. For the present invention, it should be understood that the engagement of clutches C1 and C2 will establish the fourth speed ratio which is the third highest speed ratio. The fifth and second highest speed ratio is engaged by operation of the clutch C2 and brake C3 while the sixth and highest speed ratio is established by the engagement of clutch C2 and brake C4.

The first through third ratios are established by combinations with the clutch C1 and brakes C3, C4 and C5. The electro-hydraulic transmission control 16 may be any of the well known or presentably available solenoid control systems. As is well known with such devices, electrical signals are supplied to various solenoids within the transmission control to establish the opening and closing of fluid pressure passages which in turn supply operating pressures for the clutches and brakes of the transmission. For the present invention, the electro-hydraulic control 16 supplies fluid pressure to a C5 apply passage 18 to pressurize the brake C5, and to a C3 apply passage 20 to pressurize the brake C3.

The transmission control also selectively pressurizes a C2 apply passage 22 which is effective to operate the clutch C2. A C1 feed passage 24 and a C4 feed passage 26 are both selectively pressurized by the control 16.

The C3 apply passage 20, C2 apply passage 22, the C1 feed passage 24 and the C4 feed passage 26 are in fluid communication with an inhibit valve, generally designated 28. The inhibit valve 28 includes a valve body portion 30 and a spool valve 32. The spool valve 32 has three equal diameter lands 34, 36 and 38, slidably disposed in a large diameter portion or valve bore 40 of the valve body 30. The valve spool 32 also has a small diameter land 42 which is slidably disposed in a small diameter valve bore 44 of the valve body 30.

Valve land 42 cooperates with the valve bore 44 to form a C2 control chamber 46 which is in fluid communication with the C2 apply passage 22. The valve lands 42 and 34 cooperate with the valve bore 40 to form a C4 control chamber 48 which is in fluid communication through a restriction 50 with a C4 apply passage 52, which in turn communicates with brake C4.

The valve land 38 cooperates with the valve bore 40 to provide a C3 control chamber 58. The chamber 58 is in fluid communication with the C3 apply passage 20. This chamber 58 also houses a spring member 60 which is operable to urge the spool valve 32 leftward as viewed in the drawing to expand the control chamber 58 and contact the control chambers 46 and 48.

The valve bore 40 is also in fluid communication with the C1 apply passage 54 and a C4 supply passage 56. The C1 apply passage 54 is in fluid communication with the clutch C1 to cooperate in controlling engagement thereof and is also in fluid communication through a restriction 62 with an exhaust passage. The feed passages 24 and 26 are interconnected with the supply passage 56 through a shuttle ball type check valve 64. This check valve is a conventional ball valve device which is operable to permit communication between which ever passage 24, 26 has the highest pressure and the supply passage 56.

The inhibit valve 28 is shown in the position that would be taken by the spool 32 when the C4 feed passage 26 and the C2 apply passage 22 are pressurized by the transmission control 16. When this occurs, the pressure in passage 22 is directly operable in the control chamber 46. While the fluid pressure in passage 26 is directed through the check valve 64 to passage 56 and there by the lands 36 and 38 to the passage 52. As previously described, passage 52 communicates through restriction 50 to the control chamber 48. The pressure in these control chambers 46 and 48 is sufficient to maintain the valve spool 32 rightward against the force in spring 60.

When these passages 22 and 26 are pressurized by the transmission control 16, the planetary gear arrangement of transmission 10 is conditioned for the sixth and highest forward speed ratio. Prior to the establishment of the sixth speed ratio, the valve spool 32 was held in its leftmost position by the spring 60. In this position, the passage 24 is connected between the lands 36 and 38 with the passage 52.

When the fifth ratio is established, the passage 20 is pressurized and therefore the control chamber 58 is pressurized. This adds to the spring force and holds the valve spool 32 in the leftmost position. However, on an upshift from fifth to sixth, the passage 20 is exhausted by the control 16 while the passage 26 is pressurized. This will cause the valve spool 32 to assume the rightward position shown.

If an electrical malfunction occurs such that the transmission control 16 receives no electrical power, the normal control function is to establish the fourth ratio. If when such a malfunction should occur, the transmission is operating in the sixth speed ratio a skip shift from sixth to fourth might result in engine overspeeding due to the step between the speed ratios which might be as large as 1.5. The inhibitor valve 28 prevents this skip shifting.

When the transmission control exhausts passage 26 and immediately pressurizes passage 24, which occurs during electrical failure, the restriction 50 prevents the immediate exhausting of chamber 48. Therefore the pressure in passage 24 will be supplied through the check valve 64 to the passage 56 and between lands 36 and 38 to the passage 52.

As previously described, this will cause pressurization of the control chamber 48 and the sixth and highest speed ratio will be maintained. This will permit the operator to drive the vehicle to a repair station, however, performance will not be at a maximum.

When in the normal course of events, a downshift from sixth ratio is requested, the transmission control 16 will first energize the C3 apply passage 20 to engage brake C3 and release fluid pressure in passage 26. The pressure in passage 20 operating in the control chamber 58 will assist the spring 60 to move the valve spool 32 leftward. In the leftward position, the passage 54 is connected between the lands 34 and 36 with the C1 feed passage 24. The movement of the spool 32 and therefore the shift timing is controlled in part by the restriction 50.

After a downshift to fifth, the transmission can downshift to the fourth or third highest speed ratio by having the control 16 pressure passage 24 while exhausting passage 20. With the valve spool 32 in the leftward or spring set position, fluid pressure in passage 24 will pass between the lands 34 and 36 to passage 54 which controls the engagement of clutch C1. With both clutches engaged, the transmission is conditioned for fourth speed ratio.

Thus, it is seen that during normal transmission operation, a skip shift between sixth ratio and fourth ratio can not be accomplished. The fifth speed ratio must be established to cause the inhibitor valve 28 to disconnect the passage 52 from the supply passage 56. This occurs when the valve spool 32 moves leftward so that the valve land 38 closes the passage 56 while valve land 34 opens the passage 54. Since the passage 56 is closed during normal downshifting prior to pressurization of passage 24, the passage 52 cannot be pressurized by fluid through the check valve 64.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A shift inhibit valve in a hydraulic control system of a transmission having a plurality of speed ratios established by the actuation of friction devices, said control system having -a source of hydraulic fluid pressure and control valve means; said shift inhibit valve comprising: a stepped diameter valve bore having at least a large diameter portion and a small diameter portion; a valve spool movable in said valve bore to an inhibit position and a noninhibit position and having a plurality of land means disposed in sliding valve relation with said valve bore and including a small diameter land disposed in said small diameter portion and cooperating therewith to form a first control chamber, a first large diameter land disposed in said large diameter portion and cooperating with said large diameter portion and said small diameter land to form a second control chamber, second and third large diameter lands slidingly disposed in the large diameter portion and reduced diameter means separating said first and second large diameter lands, and said second and third large diameter lands, said third large diameter land cooperating with said valve bore to form a spring and control chamber; spring means in said spring and control chamber for urging said valve spool to said noninhibit position to reduce the volume of the first and second control chambers and to increase the volume of said spring and control chamber; first control passage means for cooperating in controlling the engagement of a friction device for establishing a third highest speed ratio in a transmission and being in fluid communication with said first control chamber; second control passage means for cooperating in controlling the engagement of a friction device for establishing a highest speed ratio in the transmission and being in fluid communication with said second chamber and with the reduced diameter means separating said second and third large diameter lands; third passage means for cooperating in controlling the engagement of a friction device for cooperating in controlling a second highest speed ratio and being in fluid communication with the control and spring chamber for supplying fluid pressure thereto to force said valve spool to said noninhibit position; fourth passage means for cooperating in controlling the engagement of a friction device for cooperating in the establishment of the third highest speed ratio and being in fluid communication with said valve bore to be closed when the valve spool is in the inhibit position and open between the first and second large diameter lands when the valve spool is in the noninhibit position; and fifth passage means for selectively distributing fluid to said valve bore to be distributed by said valve spool to said second passage means when said valve spool is in said inhibit position and to said fourth passage when said valve spool is in said noninhibit position, whereby a ratio change from said highest speed ratio to said third highest speed ratio cannot occur without a ratio change from said highest speed ratio to said second highest speed ratio.

2. A shift inhibit valve in a hydraulic control system of a transmission having at least six forward speed ratios established by the actuation of friction devices, said control system having a source of hydraulic fluid pressure means and control valve means; said shift inhibit valve comprising: a stepped diameter valve bore having a large diameter portion and a small diameter portion; a valve spool movable in said valve bore to an inhibit position when said sixth speed is established and a noninhibit position during all other speed ratios and having a plurality of land means disposed in sliding valve relation with said valve bore and including a small diameter land disposed in said small diameter portion and cooperating therewith to form a first control chamber, a first large diameter land disposed in said large diameter portion and cooperating with said small diameter land to form a second control chamber, second and third large diameter lands slidingly disposed in the large diameter portion and reduced diameter means separating said first and second large diameter lands, and said second and third large diameter lands, said third large diameter land cooperating with said valve bore to form a spring chamber and a control chamber; spring means in said spring chamber and control chamber for urging said spool to said noninhibit position to reduce the volume of the first and second control chambers and to increase the volume of said spring chamber and control chamber; first control passage means for cooperating in controlling the engagement of a friction device for establishing the fourth, fifth and sixth speed ratios in a transmission and being in fluid communication with said first control chamber; second control passage means for cooperating in controlling the engagement of a friction device for establishing the sixth speed ratio in the transmission and being in fluid communication with said second chamber and with the reduced diameter means separating said second and third large diameter lands, said first and second chambers being pressurized when the sixth ratio is established to urge said valve spool against said spring to said inhibit position; third passage means for cooperating in controlling the engagement of a friction device for establishing the fifth speed ratio and being in fluid communication with the control and spring chamber for supplying fluid pressure thereto to force said valve spool to said noninhibit position; fourth passage means for cooperating in controlling the engagement of a friction device for cooperating in the establishment of the fourth speed ratio and being in fluid communication with said valve bore to be closed when the valve spool is in the inhibit position and open between the first and second large diameter lands when the valve spool is in the noninhibit position; and fifth passage means for selectively distributing fluid to said valve bore to be distributed by said valve spool to said second passage means when said valve spool is in said inhibit position and to said fourth passage when said valve spool is in said noninhibit position, whereby a ratio change from the sixth speed ratio to the fourth speed ratio cannot occur without a ratio change from the sixth speed ratio to the fifth speed ratio.

* * * * *